United States Patent [19]

Lynch et al.

[11] Patent Number: 5,543,234
[45] Date of Patent: Aug. 6, 1996

[54] MOLDED WOOD COMPOSITES HAVING NON-BLISTERING PROFILE WITH UNIFORM PAINTABILITY AND NESTING

[75] Inventors: Steven K. Lynch, St. Charles; Mark A. Ruggie, Lombard, both of Ill.; William E. Rinker, New Albany, Pa.; David G. Izard, Wauconda; William J. Young, Crystal Lake, both of Ill.

[73] Assignee: Masonite Corporation, Chicago, Ill.

[21] Appl. No.: 262,472

[22] Filed: Jun. 20, 1994

(Under 37 CFR 1.47)

[51] Int. Cl.⁶ .................................................. B32B 9/00
[52] U.S. Cl. .................. 428/537.1; 428/109; 428/156; 428/171; 428/248; 428/281; 428/286; 428/290; 428/326; 428/535; 428/542.8; 264/112; 264/113; 264/120; 264/316
[58] Field of Search ................................. 428/109, 248, 428/542.8, 326, 537.1, 156, 535, 171, 407, 281, 209, 286; 264/112, 113, 120, 122, 119, 316, 109, 511, 261, 266, 267

[56] References Cited

U.S. PATENT DOCUMENTS

| | | | |
|---|---|---|---|
| 4,503,115 | 3/1985 | Hemels et al. | 428/281 |
| 4,830,929 | 5/1989 | Ikeda et al. | 428/542.8 |
| 5,401,556 | 3/1995 | Ishitoya et al. | 428/109 |

*Primary Examiner*—Patrick J. Ryan
*Assistant Examiner*—Abraham Bahta
*Attorney, Agent, or Firm*—Marshall, O'Toole, Gerstein, Murray & Borun

[57] ABSTRACT

A molded wood composite article man-made from wood fibers or wood particles on at least an upper, molded surface of the article, and a method of manufacturing the article to include a relatively uniform density, detailed design contours and textured aesthetics on one or more molded depression-interior inclined surfaces, while preventing embrittlement, softness and blistering of the article along the depression-interior inclined surfaces. These attributes are achieved by molding one or more depressions into an initially planar layer of cellulosic material, wherein the molded depressions have one or more inclined walls that have upper surfaces, along essentially an entire inclined span, that include detailed design contours, including adjacent curved and planar portions, e.g., bead and cove.

43 Claims, 4 Drawing Sheets

MOLDED WOOD COMPOSITES HAVING NON-BLISTERING PROFILE WITH UNIFORM PAINTABILITY AND NESTING

FIELD OF THE INVENTION

The present invention relates to a molded wood composite article, containing one or more molded depressions, and a method of making the molded wood composite article, having an inclined profile embossed or molded into a depression-interior portion of the article. More particularly, the molded wood composite article of the present invention is made from a combination of cellulosic material, such as cellulosic fibers or cellulosic particles, and a natural or synthetic binder, such as a phenol formaldehyde or urea formaldehyde resin, including at least about 80% cellulosic material, and molded from a mat having at least an upper surface formed from refined, fibrillated cellulosic fibers, e.g., a fiberboard mat, such as hardboard; or made from cellulosic particles, such as particle board. The major surfaces of the articles are molded from a planar layer of cellulosic material, e.g., a fiberboard mat, made either by the wet process or the dry process, preferably the dry process; or made from a layer of cellulosic particles and a resin binder. The planar layer of cellulosic material is molded when the cellulosic layer contains less than about 10% moisture, based on the dry weight of the cellulosic layer, regardless of the method of making the cellulosic layer. Essentially no gas venting is required until the molding operation is complete and the mold is opened. The depression-interior inclined molded profile does not blister, has relatively constant paint holdout, and provides better nesting, one article on another, for shipping and storage without damage.

BACKGROUND OF THE INVENTION

Man-made boards, such as fiberboard, e.g., hardboard; chipboard; oriented strand board-fiberboard composites; particle board; oriented strand board-particle board composites; and the like, commonly are embossed on their intended visible major surface in the manufacture of interior panelling, exterior siding, and particularly in the manufacture of door skins that are laminated to a support structure or frame, on both major surfaces, for replicating multi-panel doors having surfaces that are man made, rather than the very expensive natural wood "6-panel" doors. Commonly, such articles are molded from a planar cellulosic mat to include one or more interior or "closed" depressions, within an interior of the article, such as one or more square or rectangular depressions that do not extend to an outer edge of the article.

The cellulosic fibers or particles used to form the loose mat, e.g., a 2 inch thick layer of cellulosic fibers, initially may be bone dry after the fibers have been dried and felted, but the cellulosic materials in such mats absorb moisture from the atmosphere and generally include about 2% to about 10% moisture when molded via hot pressing, depending upon the humidity in the region where such mats are stored and/or manufactured. A molded or embossed design in a layer of cellulosic material that leaves interior depressions in the molded article is difficult to provide without surface defects because gases formed during hot-pressing, e.g., vaporized moisture, cannot escape from the mold cavity via venting to an exterior edge of the molded article when the molded article is hot-pressed to a constant mold level completely surrounding the formed interior depressions.

In some mold designs formed in wood composites, venting is accomplished by disposing a gas pervious material, e.g., a temperature-resistant, gas-pervious fabric, between a back half of the mold cavity and a non-visible side of the product being molded, to achieve controlled gas venting without blister formation in the molded article. Controlled gas venting during the hot-press molding of wood composite articles, however, tends to disrupt the complete consolidation and bonding of the molded articles along the molded edges, due to the escape of gas at the edges, causing excessive scrap or wasted material. Wasted material results from trimming the incompletely consolidated edges, containing valuable cellulosic material and binder, which must be trimmed away to achieve solid, completely consolidated, scratch resistant man-made board material over the entire major, exterior surface of the trimmed molded article. Accordingly, when such waste cannot be tolerated, a mechanical dam is included, surrounding the mold cavity, to eliminate essentially all gas venting during the hot-press molding step to avoid "punky" edges that end up as waste.

A typical mechanical mold dam is a metal border extending from, and perpendicular to, one half of the mold or die, and extending, for example, 0.030 inch vertically toward the other half of the mold or die, to create sufficient pressure on the material being molded, completely surrounding the mold cavity, to prevent essentially all gas escape until the mold cavity is opened. Gas venting, when such mechanical dams are used, occurs almost exclusively as a result of opening the mold cavity upon completion of the hot-press molding step. The sudden reduction in pressure upon mold cavity opening, however, sometimes causes a sudden release of water vapor trapped beneath the upper surface of the molded article, thereby causing a portion of the visible molded surface to bubble or blister—a portion of the molded surface delaminates from the remaining thickness because of the sudden escape of gas from an interior portion of the molded article. This blistering problem is most severe when attempting to mold detailed designs onto an inclined interior surface portion of closed depressions molded into wood composites.

Other problems occur in attempting to form the above-described inclined molded portions on an interior surface of closed depressions in a molded wood composite article, particularly when it is commercially necessary to paint such inclined surfaces to provide an aesthetically pleasing outer surface. One type of product, in particular, that must include excellent embossing detail and superior aesthetic qualities to be commercially acceptable, is a door skin that simulates a multi-panel natural wood door on both major faces of a support substrate or frame member. Door skins, or door faces, require detailed, inclined interior molded walls having a plurality of relatively close contours that include varied curves and planar surfaces. It has been found that these interior, inclined molded surfaces of interior inclined molded depression walls are very difficult to paint uniformly due to density differences, because of various curved and planar adjacent contours and due to the confined locations of the inclined surfaces within the relatively small, molded depressions. These angled or inclined surfaces on wall portions molded into depressions formed in the interior of the product are extremely difficult to provide with embossed surfaces representing, for example, a wood grain pattern, since such embossed texture on depression-interior inclined walls have a tendency to cause the article to stick to the mold cavity at the embossed inclined wall, causing fiber to pull away from the surface of the molded article when it is removed from the mold cavity.

Another problem common to the molded wood composite articles described above is in stacking a plurality of the molded articles for efficient shipping. Extant door skins, for example, when stacked one above another, having a depression profile as shown in the drawing identified as "Prior Art" have a tendency to damage, particularly in the upper decorative surface of the lowermost articles, due to abrasive contact on the detailed depression-interior inclined surfaces, particularly on the convex, uppermost "bead" of a "bead and cove" Colonist design, where aesthetics are most important, and where damage is most apparent.

The molded wood composite articles of the present invention solve some or all of the above-mentioned deficiencies in prior art molded wood composite articles to provide a molded wood composite article that has inclined, decorative depression-interior molded walls having upper, decorative inclined surfaces of relatively uniform density; can be painted with uniform paint hold-out; has molded, inclined surfaces that are accessible for buffability, in the preferred embodiment; and wherein the molded, inclined depression-interior surfaces are capable of being embossed with excellent texture or grain detail to provide an extremely aesthetic, detailed texture or grain design. In the preferred embodiment, the inclined depression-interior walls are longer and less severely inclined (about 25° to about 38°) than prior art depression-interior molded wall surfaces, and include a profile in the depression-interior, inclined molded surfaces such as an embossed "bead and cove" design, that permits excellent stacking of the articles for efficient, and essentially damage-free shipping and storage, while stacking more articles, one upon another.

SUMMARY OF THE INVENTION

In brief, the present invention is directed to a molded wood composite article man-made from wood fibers or wood particles on at least an upper, molded surface of the article, and a method of manufacturing the article to include a relatively uniform density, detailed design contours and textured aesthetics on one or more molded depression-interior inclined surfaces, while preventing embrittlement, softness and blistering of the article along the depression-interior inclined surfaces. These attributes are achieved by molding one or more depressions into an initially planar layer of cellulosic material, wherein the molded depressions have one or more inclined walls that have upper surfaces, along essentially an entire inclined span, that include detailed design contours, including adjacent curved and planar portions, e.g., bead and cove. The inclined depression-interior molded walls, having upper surfaces that include the adjacent curved and planar contours, have a thickness or caliper measurement, measured normal to a tangent at any point along the upper (finished) contoured surface, that varies at most about 20% from the caliper so measured at any other point along the depression-interior contoured, inclined surface span, with the exception of the ends of the inclined span. Preferably, the thickness differential along the entire contoured, inclined surface (with the exception of the ends of the inclined span, where each end of the inclined surface joins a horizontal, as molded, portion of the article) is at most about 15%, more preferably a maximum thickness differential of about 10%, while providing detailed, adjacent curved and planar surfaces on the depression-interior inclined wall surface, e.g., a "bead and cove" molded pattern.

It has been found that the mean thickness or caliper along the entire contoured inclined depression-interior molded walls of a wood composite article, molded in accordance with the present invention, should be molded to be about 2% to about 15% thinner, preferably about 3% to about 10% thinner, and more preferably about 5% to about 8% thinner, than a thickness of adjoining horizontal portions of the wood composite articles. Where the ends of the depression-interior inclined contoured walls meet the horizontal (as molded) surfaces, the article should be compressed or "pinched" to a thickness or caliper that is about 1% to about 12%, preferably about 2% to about 10% less than the mean thickness along the depression-interior inclined wall span between the two "pinched" ends of each inclined wall. It has been found that an article formed to include such an inclined wall with "pinched" ends has a relatively uniform density and excellent strength along the entire span of the inclined wall, particularly where the inclined wall ends join horizontal portions of the molded article, while preventing embrittlement, softness and blistering along the entire upper surfaces of the depression-interior inclined wall(s), to achieve excellent paint-holdout and uniformity, and without blistering along the depression-interior inclined wall surfaces, with essentially no gas venting required during the molding cycle.

It is apparent to those skilled in the art that the articles described herein can be formed from materials other than cellulosic materials, e.g., polymeric or plastic articles, while advantageously including one or more interior, inclined walls having a contoured upper surface with adjacent curved and planar portions having an angle of inclination from the horizontal of 38° or less, and a thickness along the inclined span that varies no more than about 20%, preferably no more than about 15%, and more preferably no more than about 10%. Such an article, regardless of the material used to form the article, will nest, one article above another, for storage and transport without significant surface scratching or other surface damage and provide for easier application of decorative surface details in the upper surface of depression-interior, inclined walls.

Accordingly, one aspect of the present invention is to provide a molded, wood composite article, and method of manufacturing the article, that includes interior molded depressions having an inclined, decorative surface that has a relatively uniform density along the entire inclined surface, which is not brittle or blistered as a result of the molding process.

Another aspect of the present invention is to provide a molded, wood composite article, and method of manufacturing the article, containing at least about 80% cellulosic material, that is molded from an incompletely consolidated planar mat or preform using heat and pressure to include a decorative inclined surface in a molded depression within the interior of the article, wherein the inclined surface does not blister, while permitting essentially no gas venting from the mold cavity during the hot press molding process.

Still another aspect of the present invention is to provide a molded man-made wood composite article that includes a molded depression that includes adjacent curved and planar surfaces, e.g., "bead and cove" on a depression-internal inclined surface having an inclination of about 25° to about 45°, preferably about 25° to about 38° from a horizontal lower surface integral with a lower end of the inclined wall, that nests with a molded inclined wall undersurface of an identical wood composite article for storage and shipping without damage to the inclined surfaces; and wherein the inclined surfaces have a uniform paint-holdout capability and are easily embossed with a texture or other decorative design, e.g., simulating wood grain.

Another aspect of the present invention is to provide a decorative article of manufacture, that may be formed from plastic, or other non-wood material, that includes a depression having an interior inclined wall that has an angle of inclination, from a horizontal at a lowermost end of the inclined wall, in the range of about 25° to about 38°, wherein the depression-interior inclined wall has a thickness 20% or less, preferably 15% or less, and more preferably 10% or less relative to a mean thickness of said inclined wall between upper and lower planar walls that are integral with upper and lower ends, respectively, of the inclined wall.

The above and other aspects and advantages of the articles and methods of the present invention will become more apparent from the following detailed description of the preferred embodiments, taken in conjunction with the drawings.

DETAILED DESCRIPTION OF THE PREFERRED EMBODIMENTS

Figure 1:
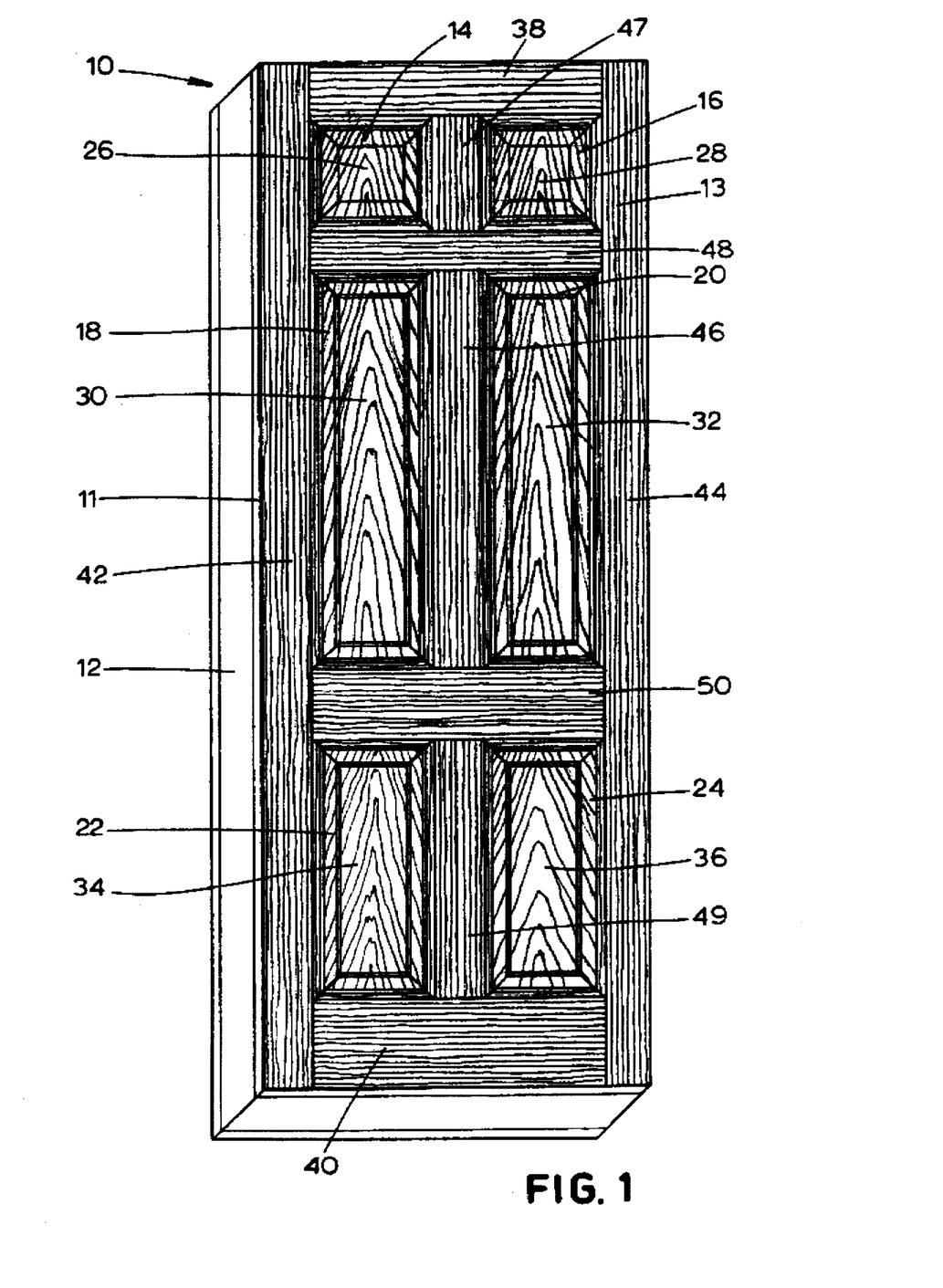
FIG. 1 is a perspective view of a door manufactured to include two laminated door skins on the major outer surfaces, the entire door, or at least each door skin being manufactured in accordance with the principles of the present invention.

In the preferred embodiments shown in the drawings, the molded wood articles of the present invention are molded in the form of a multi-panel door, or, more preferably, as a thin door skin to be laminated or otherwise adhered to a core, frame or support substrate, on both major surfaces, to simulate a solid, natural wood door, e.g., an interior or exterior passage door, as shown in FIG. 1, or a cabinet door. It should be understood, however, that the principles of the present invention apply to much more than the manufacture of doors or door skins and apply to any molded man-made composite wood article that includes one or more depression-interior walls that have an inclined, contoured decorative surface extending within the depression and adjacent to a planar, e.g., horizontal surface portion of the molded article. Examples of other composite, molded wood articles that are capable of being manufactured in accordance with the principles of the present invention include decorative hardboard; interior and exterior siding; decorative interior wall panelling; structural cores; roofing material; crating structures; and the like.

A surface portion of the articles of the present invention should be formed from cellulosic material, such as fibrillated cellulosic fibers, or cellulosic particles and a binder capable of adhering the cellulosic material together into a structurally stable article. The cellulosic fibers, whether in the form of refined, fibrillated fibers, or in the form of discrete particles, can be molded and adhered together with natural or synthetic binders to provide aesthetically pleasing contours and texture in all exterior, visible surfaces, including the depression-interior inclined wall surfaces. The articles of the present invention can be molded as a thin, e.g., 0.1 to 0.2 inch thick door skin, or the articles can be molded together with an underlying core material, such as an oriented strand board, particle board, plywood, wafer board, or a thermoplastic or thermosetting plastic core material by molding the face or skin cellulosic material together with the underlying core material. The following U.S. patents are hereby incorporated by reference as examples of various different cores, having cellulosic fibers or particles as a surface layer, that are suitable for molding in accordance with the present invention: Shaner, U.S. Pat. Nos. 4,361,612; Wentworth 4,364,984; Greten 3,098,781; Birmingham 2,343,740; Bryant 3,308,013; Elmendort 2,831,793; Hunt 4,246,310; and Barnes 4,610,913 . Alternatively, a thin cellulosic molded surface layer can be molded separately, in accordance with the present invention, and later laminated to a support structure.

Turning now to the drawings, and initially to FIG. 1, there is illustrated a door, generally designated by reference numeral 10, shown horizontal, as molded, that includes an upper door skin 11, and an identical, lower door skin 11A secured to opposite major surfaces of a door frame or interior support structure 12. The door skins 11 and 11A can be molded separately to impart aesthetic surface contours in the visible outer surfaces that correspond to contours essentially identical to contours of a mold cavity (not shown). The door skins 11 and 11A then can be secured, e.g., adhesively, to a suitable core or frame structure 12. The lower half of the mold cavity, if shown, would be essentially the same in general contour to an upper surface 13 of the door skin 11, except that the lower mold half would be slightly larger horizontally, in the depression dimensions, to allow for the thickness of the molded cellulosic material forming the door skin. The upper mold half (not shown) is dimensioned complementary to the upper surface 13 of the door skin, and includes raised mold portions dimensioned to correspond to the depressions shown in the upper surface 13 of door skin 11.

The door skins 11 and 11A are molded with the mold cavity or die halves disposed in a generally horizontal disposition so that the upper major surface 13 will be described as horizontal—corresponding to its disposition during molding—and it will be recognized that the position of the molded article, in use, may very well be opposite, as in the case of door skins 11, where the molded major surface 13 normally would be disposed in a vertical orientation. The exemplary door skins, e.g., 11, shown in FIG. 1, are molded to simulate a multi-panel door surface, and the preferred embodiment shown in FIG. 1 contains six molded depressions 14, 16, 18, 20, 22 and 24, surrounding six panels 26, 28, 30, 32, 34 and 36. Further, each depression is completely surrounded by planar, e.g., horizontal door surface portions 38, 40, 42, 44, 46, 47, 48 and 49, lying in a common plane.

In the preferred 6-panel door skins 11 and 11A shown in FIG. 1, the depressions 14, 16, 18, 20, 22, and 24 are rectangular in shape and the rectangular depressions completely surround the horizontal door panels 26, 28, 30, 32, 34 and 36 that lie in the same horizontal plane as the horizontal door surface portions 38, 40, 42, 44, 46, 47, 48 and 49.

Figure 2:
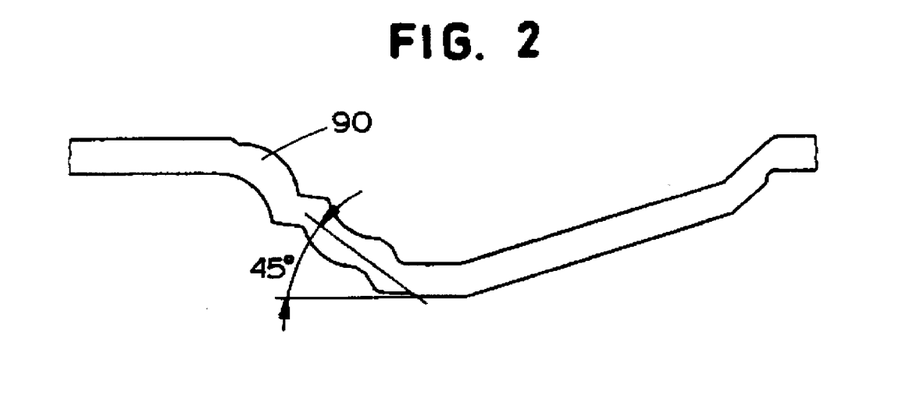
FIG. 2 is a side (profile), partially broken-away view of one embodiment of a molded depression that includes an interior inclined wall having curved and planar contours in its surface, forming a portion of an article such as that shown in FIG. 1.
Figure 3A:
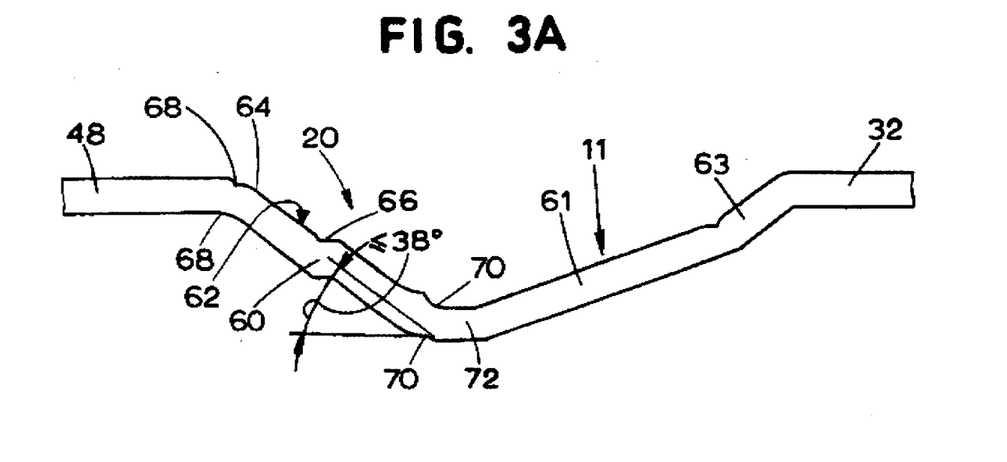
FIG. 3A is a side (profile), partially broken-away view of another, preferred embodiment of a molded depression, taken along the line 3A—3A of FIG. 6, that includes an interior inclined wall having curved and planar contours in its surface, forming a portion of the article of FIG. 1.

The rectangular molded depressions 14, 16, 18, 20, 22, and 24, are molded to include depression-interior inclined walls having upper surfaces that, in accordance with the present invention, are molded to a relatively constant density and include contours, preferably over the full span of the depression-interior inclined wall surfaces, that extend downwardly and inwardly from a planar, e.g., horizontal surface portion (38, 40, 42, 44, 46, 47, 48 and/or 49) of the door skin 11 to a lower end of the depression-interior inclined wall surface, at or near a lowermost end of the depression, as will be described in more detail with reference the depression profiles shown in FIGS. 2 and 3A.

In accordance with one embodiment of the present invention, instead of molding two relatively thin, e.g., about ⅛ inch, door skins 11 and 11A separately and then securing the door skins on opposite major surfaces of a door frame or other support structure 12, the support structure 12 can be disposed between the two door skins 11 and 11A, in the mold cavity, to consolidate the upper and lower layers that form the door skins 11 and 11A under heat and pressure, while simultaneously bonding the door skins to the support structure 12, in a single molding step. In this manner, a separate bonding step for securing the door skins 11 and 11A to the support structure 12 is not needed, while forming a strong bond between the skins 11 and 11A and the support structure via resin binder included in the cellulosic layers 11 and 11A surrounding the support structure 12. In this embodiment, other decorative products can be made, other than door skins, and the support structure 12 can be a cellulosic material, e.g., an oriented stand board or fiberboard, or a plastic material, e.g., foamed or solid polymer, e.g., thermoplastic or thermosetting polymer, that will yield at its major surfaces to receive the molded depressions formed in the door skins 11 and 11A.

Turning first to the preferred embodiment of the depression profile shown in FIG. 3A, depression 20, and preferably each other depression 14, 16, 18, 22 and 24, is molded to include a depression-interior contoured, inclined wall 60 having a contoured upper surface 62, preferably including a bead or curved contour 64, and a planar or cove contour 66. The contoured, decorative depression-interior wall surface 62 preferably extends from an upper end 68 to a lower end 70 of the inclined wall 60. The upper end 68 of the inclined wall 60 is integral with the planar door surface portion 46, and the lower end 70 of the inclined wall 60 is integral with a planar, e.g., horizontal, lowermost wall 72 forming a bottom wall of the depression 20. Lowermost wall 72 joins panel 32 via upwardly sloped walls 61 and 63.

The inclined depression-interior molded wall 60 having an upper surface that includes the adjacent curved contour 64 and planar contour 66, has a thickness or caliper measurement, measured normal to a tangent at any point along the upper (finished) contour surface 62, that varies at most about 20% from the caliper so measured at any other point along the inclined surface span between inclined ends 68 and 70, with the exception of the thickness or caliper measurement at the ends 68 and 70 of the inclined span. Preferably, the thickness differential along the entire contoured, inclined surface (with the exception of the ends 68 and 70 of the inclined span, where each end of the inclined wall 60 joins a planar wall, 48 and 72, respectively) is at most about 15%; more preferably a maximum thickness differential of about 10%; most preferably with about 90% of the inclined wall thickness being within about 5% to about 8% in thickness. The upper surface 62 of the inclined wall 60 should include detailed, adjacent curved 64 and planar 66 surfaces, e.g., a "bead and cove" molded pattern.

It has been found that the mean thickness or caliper along the entire inclined depression-interior molded wall 60 of the wood composite article, e.g., door skin 11, molded in accordance with the present invention, should be molded to be about 2% to about 15% thinner, preferably about 3% to about 10% thinner, and more preferably about 5% to about 8% thinner, than a thickness of the adjoining planar wall portions 48 and 72 of the wood composite articles. Where the ends 68 and 70 of the depression-interior inclined contoured walls 60 meet the horizontal (as molded) surfaces 48 and 72, respectively, the article 11 should be compressed or "pinched" to a thickness or caliper that is about 1% to about 12%, preferably about 2% to about 10% less than the mean thickness along the span of the depression-interior inclined wall 60 between the two "pinched" ends 68 and 70, of each inclined wall 60. An article formed to include such an inclined wall 60 has a relatively uniform density on its contoured surface 62, and excellent strength along the entire span of the inclined wall 60, particularly where the inclined wall ends 68 and 70 join planar, e.g., horizontal, portions 48 and 72, respectively, of the molded article. Upper surface 62 of inclined wall 60, molded as described above, is not brittle or soft along the entire upper surface 62 of the inclined wall, while providing excellent paint-holdout and uniformity, and without blistering along the depression-interior inclined wall surface 62, with essentially no gas venting required during the molding cycle.

Figures 4, 5A, 5B:
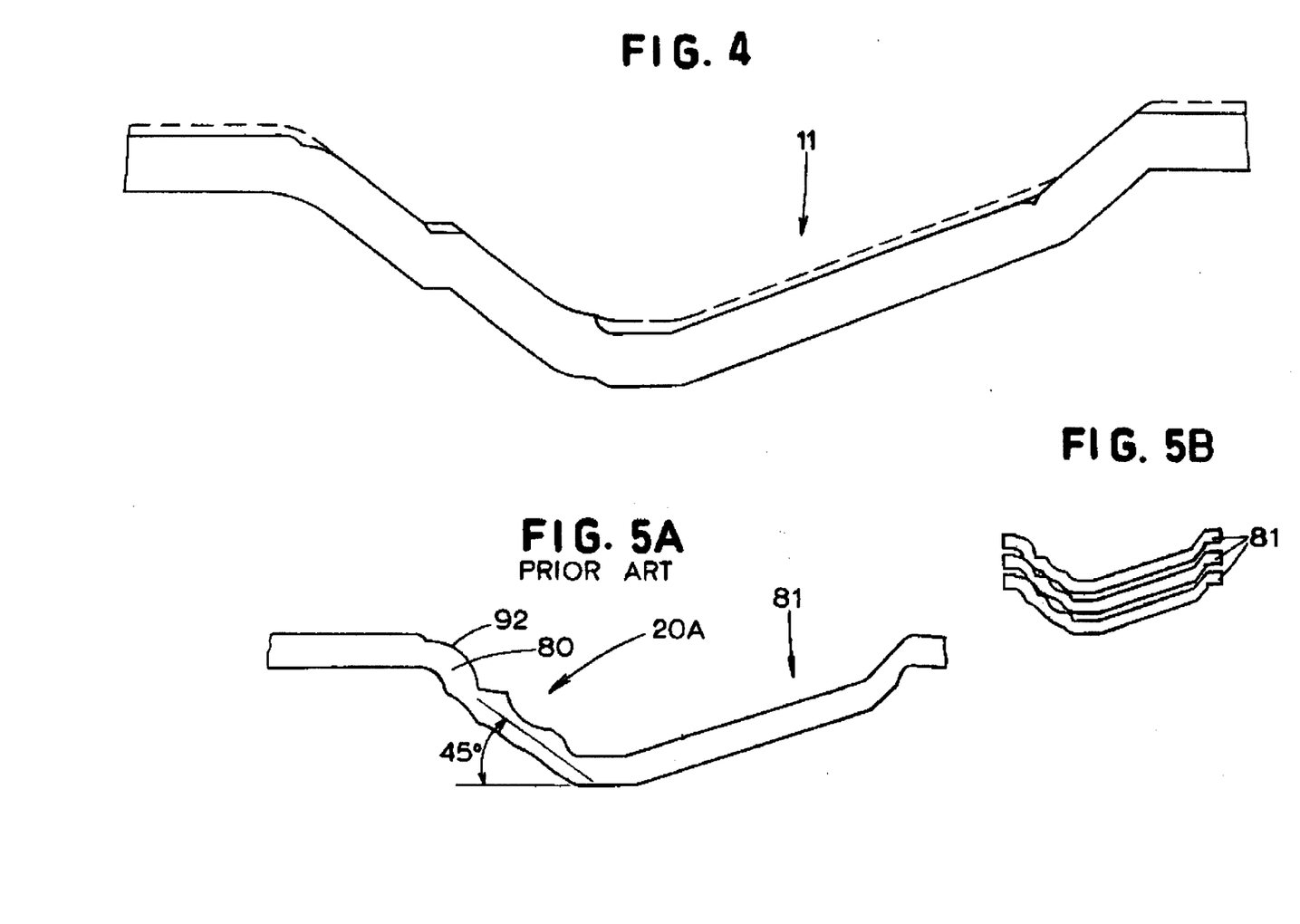
FIG. 4 is a side (profile), partially broken-away view of the molded depression of FIG. 3A showing the nesting position of a lower surface of a stacked depression portion of another identical article, in dashed lines.
FIG. 5A is a side (profile), partially broken-away view of a prior art molded depression, including an inclined interior wall having a "Colonist" design in its upper surface.
FIG. 5B is a side (profile), partially broken-away view of a plurality of the prior art molded depressions of FIG. 5A stacked one above another.
Figure 6:
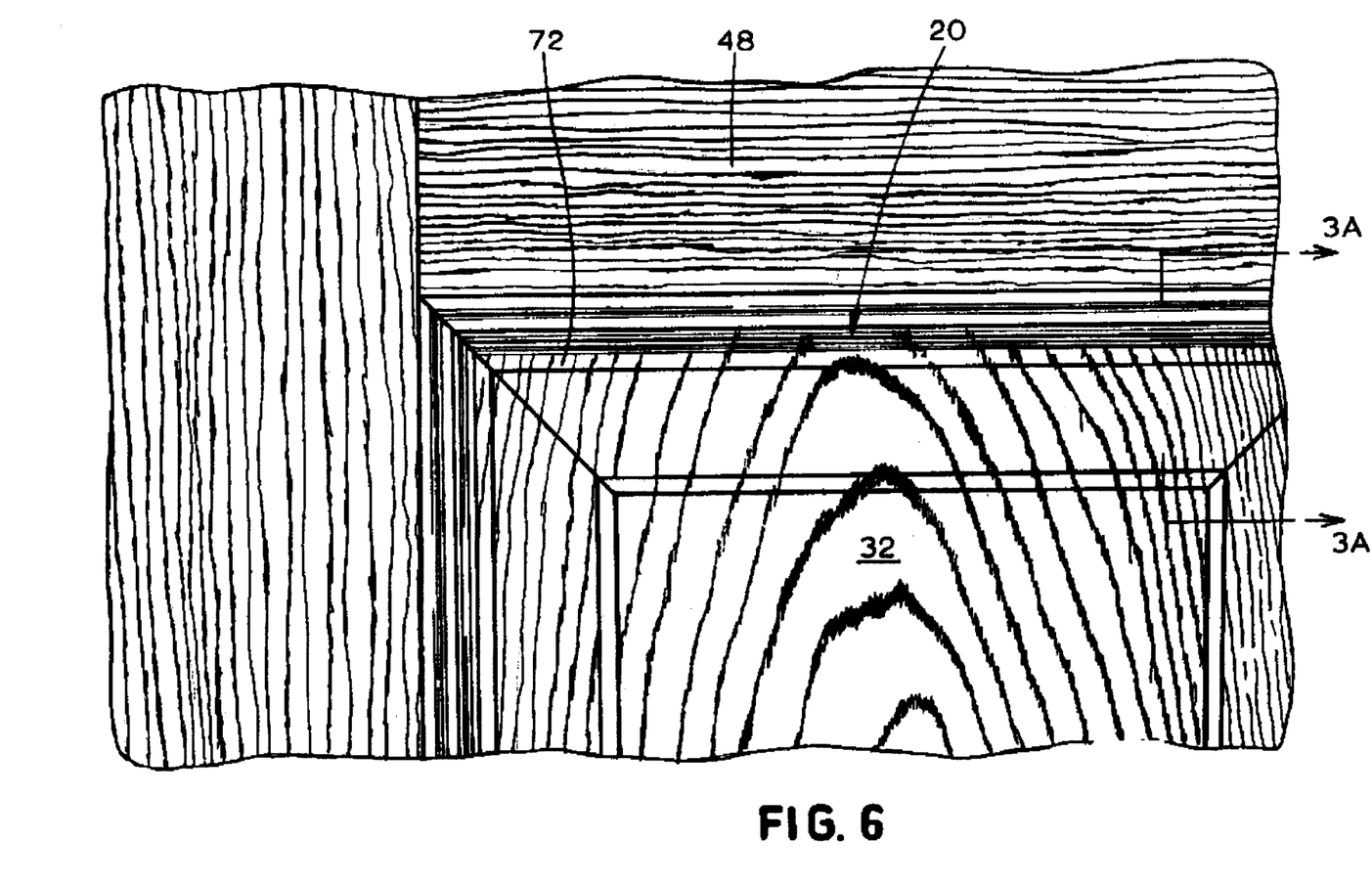
FIG. 6 is a partially broken-away, enlarged top view of a depression portion of the molded door skin shown as a top layer of the door of FIG. 1.

The depression-interior molding profile of the prior art varies widely in thickness of the inclined wall 80, such as the Colonist profile of FIG. 5A or other known molded door-facing products. Such thickness variations restrict the pressing latitude for consistently producing quality molded articles.

The profile of the prior art depression 20A in a prior art door skin 81, shown in FIG. 5A has two weaknesses that the depression profile of FIG. 3A eliminates. First, the FIG. 5A Colonist design does not allow efficient nesting of the products in stacking, handling, and shipping. Second, with the wide variation in density in the prior art depression-interior inclined wall 80, coating is uneven, and the density differences limit the manufacturing tolerance range, reducing yields. This is because widely varying properties occur in the depression-interior inclined walls, e.g., 80, when the density varies substantially.

A nominal ⅛ inch caliper molded product, such as that shown in FIG. 3A, made using a dry process fiberboard mat, containing about 1% to about 15% phenol formaldehyde resin and about 0% to about 4% wax size, initially 2 inches thick, and molded under a temperature of about 275° F. to about 550° F. and a pressure of about 400 psi to about 850 psi, shows embrittlement and fracturing when molded to a specific gravity exceeding about 1.10, sometimes as low as about 1.07. On the other end of the spectrum, if specific gravity values are below about 0.88, inclined wall surface softness can lead to easily damaged surfaces and deficiencies in coating uniformity. The relatively uniform thickness of the inclined wall 60 of FIG. 3A, and the inclined wall 90 (25° to 45°) of FIG. 2, varying less than about 20%, preferably less than about 5%, more preferably less than about 10%, over the span of the inclined wall 60, solves this problem.

Figure 3B:
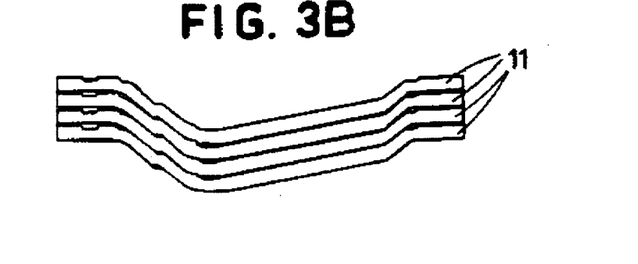
FIG. 3B is a side (profile), partially broken-away view of a plurality of the molded depressions of FIG. 3 stacked one above another.

The depression profile 20 of the preferred embodiment, shown in FIG. 3A, also provides new nesting or stacking capabilities for shipping and storage, without damage, never before achieved in a molded composite wood article having one or more depression-interior inclined surfaces, as shown in FIGS. 3B and 4, in comparison to the limited nesting capability of the prior art Colonist design shown in FIG. 5B.

The inclined wall 60 shown in FIG. 3A is inclined at 38° or less off the horizontal, as shown in FIG. 3A. This allows any two molded articles, e.g., door skins 11, to always come into the same resting position in relationship to each other when stacking, as shown in FIG. 3B. The selected 38° or less, preferably about 25° to about 38° draft angles, on the inclined walls 60, face each other on both sides of the profile pattern and generate a consistent "seat" locating, holding, and locking a "cavity" molded backside to a "core" molded faceside. The normal caliper (the dimension perpendicular) in any molded part of the profile of the inclined wall 60 which approaches a 38° draft, in the most preferred embodiment, should be compressed to a thickness no less than about 5% but not more than about 8% thinner, compared to that caliper measured normal to the adjacent planar, e.g., horizontal, wall sections 48 and 72. This is particularly advantageous when the planar or horizontal surface portions of the molded product represents approximately 75% to 90% of the product surface area, typical in molded door skin designs. To achieve the full advantage of the present invention, over 90% of the wall thickness of inclined wall 60 (FIG. 3A) is within about 5% to about 10% of the thickness of wall 60 at any other point.

The aesthetic appearance of the inclined, depression-interior wall 60 (FIG. 3A) has been maintained by keeping major visual elements of shadow, depth, and width in close proportion to the original Colonist design of FIG. 5A.

Density differences in the inclined wall 80 in the prior art profile (FIG. 5A) promote surface indentation upon transport, when stacked one article on another, at prior art low density areas. This is often seen in the prior art bead location 92, where skin to skin contact (FIG. 5B) occurs during shipment to door manufacturers. A significant reduction in nesting weight per unit area on the bottom skin in a 200 piece stack is achieved with the inclined wall 60 in FIG. 3A. This accounts for the elimination of fracturing that can occur in skins located near the bottom of a pallet of stacked molded articles, as shown in FIG. 5B. With the depression-interior inclined wall thickness relationships described above, and as shown in FIG. 3A, the stacked surface bearing area is increased by seven times that of the "Colonist" bearing area shown in FIGS. 5A and 5B. In addition, the molded articles shown in FIGS. 3A and 3B lie flatter, resisting warpage and cupping which can occur in-process before door assembly lamination takes place.

A stacked pallet of molded articles shown in FIG. 3A also reduces the volume being shipped by eliminating 41% of the void space required when 200 "Colonist" (FIG. 5A) skins are stacked for shipment, to achieve an overall container volume reduction of greater than about 20% (based on 200 "Colonist" skins measuring 35 ¼ inches versus 200 (FIG. 3A) skins measuring 28 inches high). The actual unit height may be slightly higher due to board springback or effect of substrate humidification.

In addition to achieving better nesting (compare FIG. 3B to FIG. 5B), it was unexpectedly found that more uniform coating characteristics were achieved with the new depression-interior inclined wall profile of FIG. 3A resulting in better efficiencies in primer (paint) application and higher fidelity prestaining finishes.

The more uniform density and lower draft angle of the inclined depression interior wall 60 of FIG. 3A provides unique finishing attributes which include reducing levels of coating to achieve full coverage and the ability to apply uniform stain application via automated reverse brushing that renders a high fidelity "furniture" type finish.

Some of the unique features of the improved depression-interior inclined wall profile shown in FIG. 3A, include 1. Uniform density improving yields out-of-press with no blistering;
2. Uniform density reducing surface damage on bottom skins after unitization;
3. Improved stacking through gap reduction between skins, achieving lower height shipping units;
4. Increased surface contact area allowing more loading weight during shipping to be applied without experiencing product damage such as burnishing or scuffing;
5. Uniform density allowing for possible paint coverage reduction;
6. Excellent prestained coating properties;
7. Improved woodgrain fidelity based on reduced fill in the embossing pattern (called ticking) resulting from the lower draft angle and reduced paint coverage;
8. Improved shipping and warehousing safety through better stacking stability (reduces potential for tipping or falling as handled in inventory);
9. Reduced packaging costs by improving skin to skin stacking stability, units become self supporting; and
10. Maintaining aesthetic continuity with the Colonist design, through similar proportional detailing with shadow-highlights and profile depth.

The articles, and method of manufacture, described herein are most advantageously formed from a substrate that includes at least a surface layer of cellulosic fiber and a binder, e.g., a fiberboard mat and a resin binder, or cellulosic wood particles and a resin binder. It will be appreciated by those skilled in the art, however, that similar articles can be formed by molding, extruding or otherwise contouring upper and lower major surfaces, as described herein, from thermoplastic or thermosetting polymers, e.g., polyethylene or polypropylene with or without reinforcing fibers, such as fiberglass, while incorporating the substantially better nesting capability, and the substantially easier inclined surface texturing advantage for the contoured upper surface of depression-interior walls when the inclined wall angle is 38° or less, and when the inclined wall does not substantially vary in thickness, as described for the cellulosic articles.

It will be understood that the present disclosure has been made only by way of preferred embodiments and that numerous changes in details of construction, combination, and arrangement of parts can be resorted to without departing from the spirit and scope of the invention as hereunder claimed.

What is claimed and sought to be secured by Letters Patent of the United States is:

1. A method of manufacturing a consolidated, man-made molded wood article having a molded surface portion containing at least about 80% by weight cellulosic material and sufficient binder to adhere the cellulosic material together into a structurally sound article comprising:

disposing a composite layer of said cellulosic material and said binder in a contoured mold cavity;

compressing the composite layer, in the mold cavity, to subject the composite layer to sufficient heat and pressure in the mold cavity to contour upper and lower major surfaces of the composite layer to correspond in shape to the contours of the mold cavity and to bind the composite layer together into a consolidated, manmade molded wood article;

molding said molded wood article in said mold cavity to include a planar wall having an upper surface adjacent to a molded depression, said depression including an inclined wall having a contoured upper surface integral with an upper surface of said planar wall, said inclined wall extending downwardly from said planar wall, toward a bottom of the depression, to a lower end of the inclined upper wall surface, said inclined wall having an angle of inclination in the range of about 25° to about 38°, and wherein a plurality of said molded wood composite articles can nest, one above another for transport, without damage to said articles.

2. A method according to claim 1, wherein the composite layer of cellulosic material and a binder comprises a mat, of essentially constant thickness, of fibrillated cellulosic fibers and a binder selected from the group consisting of a phenol-formaldehyde resin, a urea-formaldehyde resin, and mixtures thereof, said mat having 10% or less moisture, based on the dry weight of the mat, when molded.

3. A method according to claim 2, wherein the resin binder is included in the mat in an amount of about 2% to about 15% based on the total weight of the mat, dry basis.

4. A method according to claim 3, wherein the mold cavity is heated to a temperature in the range of about 275° F. to about 550° F. and presses the mat at a pressure of about 400 psi to about 850 psi.

5. A method according to claim 4, wherein the mat is molded at a temperature in the range of about 275° F. to about 550° F. and at a pressure in the range of about 400 psi to about 850 psi for a period of time of about 20 seconds to about 20 minutes.

6. A method according to claim 1, wherein molding is accomplished while essentially completely preventing the escape of gas from the mold cavity until the mold cavity is opened.

7. A method according to claim 1, wherein the composite layer of cellulosic material comprises wood particles and a binder resin, and contains 10% by weight or less moisture, when molded, based on the dry weight of the composite layer.

8. A method according to claim 1, wherein the mold cavity comprises a plurality of said depressions, simulating a multi-panel door surface.

9. A method according to claim 1, wherein said contoured surface of said depression-interior inclined wall is contoured in a bead and cove pattern between the upper and lower ends thereof.

10. A method according to claim 1, wherein a thickness of said inclined wall, over a span between said upper and lower ends of said inclined wall, within the molded depression, varies about 20% or less, in relation to a mean thickness of said inclined wall span; and the mean thickness over said inclined wall span is about 2% to about 15% thinner than a thickness of an adjacent, integral planar wall, said inclined wall being thinner at upper and lower ends of said inclined wall than said mean thickness of said inclined wall span.

11. A method according to claim 10, wherein the thickness of the inclined wall, at said ends, is about 1% to about 12% thinner than said mean thickness of said inclined wall span.

12. A method according to claim 10 wherein the thickness of said inclined wall span varies over said inclined wall span, in relation to said mean thickness of said inclined wall span, about 10% or less.

13. A method according to claim 10, wherein the specific gravity of said inclined wall, along said span, is the range of about 0.88 to about 1.10.

14. A method according to claim 10, wherein the inclined wall is at an angle, from horizontal, in the range of about 30° to about 38°.

15. A method according to claim 14, wherein the inclined wall is at an angle, from horizontal, in the range of about 35° to about 38°.

16. A method according to claim 1, wherein the article includes a plurality of said molded depressions formed in a rectangular shape, and each depression including four of said inclined walls, each inclined wall integral with two other of said four inclined walls, and wherein a bottom surface of said depression, between said inclined walls, includes a horizontal wall portion integral with a planar inclined wall portion that extends upwardly from said horizontal bottom surface of said depression to a planar panel, disposed between said contoured inclined walls and in a common plane with said planar wall that is integral with an upper surface of said contoured, inclined wall.

17. A method of manufacturing a molded wood article having a molded surface portion containing at least about 80% by weight cellulosic material and sufficient binder to adhere the cellulosic material together into a structurally sound article comprising:

disposing a composite layer of said cellulosic material and said binder in a contoured mold cavity;

closing the mold cavity to subject the composite layer to sufficient heat and pressure in the mold cavity to contour upper and lower major surfaces of the composite layer to correspond in shape to the contours of the mold cavity and to bind the composite layer together into a molded wood article;

molding said molded wood article in said mold cavity to include a planar wall having an upper surface adjacent to a molded depression, said molded depression including an inclined wall having a contoured upper surface integral with an upper surface of said planar wall, said inclined wall extending downwardly from said planar wall, toward a bottom of the depression, to a lower end of the inclined wall, said inclined wall including contoured surface portions, wherein a thickness of said inclined wall, over a span between upper and lower ends of said inclined wall, varies about 20% or less, in relation to a mean thickness of said inclined wall span, and the mean thickness over said inclined wall span is about 2% to about 15% thinner than a thickness of said adjacent planar wall; and wherein the thickness of the inclined wall at said upper and lower ends thereof is about 1% to about 12% thinner than said mean thickness of the span of said inclined wall.

18. A method according to claim 17, wherein the composite layer of cellulosic material and a binder comprises a mat, of essentially constant thickness, of fibrillated cellulosic fibers and a binder selected from the group consisting of a phenol-formaldehyde resin, a urea-formaldehyde resin, and mixtures thereof.

19. A method according to claim 18, wherein the resin binder is included in the mat in an amount of about 1% to about 15% based on the total weight of the mat, dry basis.

20. A method according to claim 19, wherein the mold cavity is heated to a temperature in the range of about 275° F. to about 550° F. and presses the mat at a pressure of about 400 psi to about 850 psi.

13

21. A method according to claim 20, wherein the mat is molded at a temperature in the range of about 275° F. to about 550° F. and at a pressure in the range of about 400 psi to about 850 psi for a period of time of about 20 seconds to about 20 minutes.

22. A method according to claim 17, wherein molding is accomplished while essentially completely preventing the escape of gas from the mold cavity until the mold cavity is opened.

23. A method according to claim 17, wherein the composite layer of cellulosic material comprises wood particles and a binder resin, and contains 10% or less moisture, when molded, based upon the dry weight of the composite layer.

24. A method according to claim 17, wherein the mold cavity comprises a plurality of said depressions, simulating a multi-panel door surface.

25. A method according to claim 17, wherein said contoured surface of said depression-interior inclined wall is contoured in a bead and cove pattern between the upper and lower ends thereof.

26. A method according to claim 17 wherein the thickness of said inclined wall varies over said inclined wall span, in relation to said mean thickness of said inclined wall span, about 10% or less.

27. A decorative article of manufacture capable of nesting, one article above another, for transport without significant surface damage, said article comprising:

an upper planar wall surrounding an integral depression, said depression having a lower planar wall, within the depression, and an inclined wall, within the depression and integral with both the upper and lower planar walls at spaced ends of said inclined wall;

said inclined wall having an upper surface integral with an upper surface of said upper and lower planar walls, said inclined upper surface being contoured to include adjacent curved and planar portions and being inclined at an angle of 38° or less from said lower planar wall, and having a thickness that varies 20% or less relative to a mean thickness of said inclined wall between said upper and lower planar walls.

28. The decorative article of claim 27 wherein said inclined wall has a thickness that is about 1% to about 12% smaller than a thickness of the upper and lower planar walls.

29. A consolidated, man-made molded wood article having a molded surface portion containing at least about 80% by weight cellulosic material and sufficient binder to adhere the cellulosic material together into a structurally sound article comprising:

a composite layer of said cellulosic material and said binder having contoured upper and lower major surfaces bound together into a consolidated, man-made molded wood article;

said article including a planar wall having an upper surface adjacent to a molded depression, said depression including an inclined wall having a contoured upper surface integral with an upper surface of said planar wall, said inclined wall extending downwardly from said planar wall, toward a bottom of the depression, to a lower end of the inclined upper wall surface, said inclined wall having an angle of inclination in the range of about 25° to about 38°, and wherein a plurality of said molded wood composite articles can nest, one above another for transport, without damage to said articles.

30. An article according to claim 29, wherein the composite layer of cellulosic material and a binder comprises a mat, of essentially constant thickness, of fibrillated cellulosic fibers and a binder selected from the group consisting of a phenol-formaldehyde resin, a urea-formaldehyde resin, and mixtures thereof.

31. An article according to claim 30, wherein the resin binder is included in the mat in an amount of about 1% to about 15% based on the total weight of the mat, dry basis.

32. An article according to claim 29, wherein the article includes a plurality of said depressions, simulating a multi-panel door surface.

33. An article according to claim 29, wherein said contoured surface of said depression-interior inclined wall is contoured in a bead and cove pattern between upper and lower ends thereof.

34. An article according to claim 29, wherein a thickness of said inclined wall, over a span between upper and lower ends of said inclined wall, within the molded depression, varies about 20% or less, in relation to a mean thickness of said inclined wall span; and the mean thickness over said inclined wall span is about 2% to about 15% thinner than a thickness of an adjacent, integral planar wall, said inclined wall being thinner at upper and lower ends of said inclined wall than said mean thickness of said inclined wall span.

35. An article according to claim 34, wherein the thickness of the inclined wall, at said ends, is about 1% to about 12% thinner than said mean thickness of said inclined wall span.

36. An article according to claim 34 wherein the thickness of said inclined wall span varies over said inclined wall span, in relation to said mean thickness of said inclined wall span, about 10% or less.

37. An article according to claim 34, wherein the specific gravity of said inclined wall, along said span, is the range of about 0.88 to about 1.10.

38. An article according to claim 34, wherein the inclined wall is at an angle, from horizontal, in the range of about 30° to about 38°.

39. An article according to claim 38, wherein the inclined wall is at an angle, from horizontal, in the range of about 35° to about 38°.

40. An article according to claim 29, wherein the article includes a plurality of said molded depressions formed in a rectangular shape, and each depression including four of said inclined walls, each inclined wall integral with two other of said four inclined walls, and wherein a bottom surface of said depression, between said inclined walls, includes a horizontal wall portion integral with a planar inclined wall portion that extends upwardly from said horizontal bottom surface of said depression to a planar panel, disposed between said contoured inclined walls and in a common plane with said planar wall that is integral with an upper surface of said contoured, inclined wall.

41. An article of manufacture having a molded surface portion containing at least about 80% by weight cellulosic material and sufficient binder to adhere the cellulosic material together into a structurally sound article comprising:

a composite layer of said cellulosic material and said binder having contoured upper and lower major surfaces bound together into a molded wood article;

said article including a planar wall having an upper surface adjacent to a molded depression, said molded depression including an inclined wall having a contoured upper surface integral with an upper surface of said planar wall, said inclined wall extending downwardly from said planar wall, toward a bottom of the depression, to a lower end of the inclined wall, said inclined wall including contoured upper surface portions, wherein a thickness of said inclined wall, over a span between upper and lower ends of said inclined wall, varies about 20% or less, in relation to a mean thickness of said inclined wall span, and the mean thickness over said inclined wall span is about 2% to about 15% thinner than a thickness of said adjacent planar wall; and wherein the thickness of the inclined wall at said upper and lower ends thereof is about 1% to about 12% thinner than said mean thickness of the span of said inclined wall.

42. An article according to claim 41, wherein the mold cavity comprises a plurality of said depressions, simulating a multi-panel door surface.

43. An article according to claim 41, wherein said contoured upper surface of said depression-interior inclined wall is contoured in a bead and cove pattern between the upper and lower ends thereof.

* * * * *

UNITED STATES PATENT AND TRADEMARK OFFICE
CERTIFICATE OF CORRECTION

PATENT NO.  : 5,543,234
DATED       : August 6, 1996
INVENTOR(S) : Lynch et al.

It is certified that error appears in the above-identified patent and that said Letters Patent is hereby corrected as shown below:

Title page,
Item [56], References Cited, U.S. PATENT DOCUMENTS, please insert the following references:

|   |   |   |
|---|---|---|
| -- 2,682,083 | 6/1954 | Patton |
| 3,212,948 | 10/1965 | McMahon |
| 4,236,365 | 12/1980 | Wheeler |
| 4,277,428 | 7/1981 | Luck et al. |
| 4,552,797 | 11/1985 | Munk et al. -- |

Item [56], References Cited, insert the following heading and references:

-- FOREIGN PATENT DOCUMENTS

| 0049299 | 4/1982 | EPO |
| 0225629 | 6/1987 | EPO |
| 3801486 | 8/1989 | Germany -- |

Column 6,
Line 29, "Elmendort" should read as -- Elmendorf --.

Column 9,
Line 1, "5%" should read as -- 15% --.

Signed and Sealed this

Third Day of September, 2002

Attest:

Attesting Officer

JAMES E. ROGAN
Director of the United States Patent and Trademark Office